US012558932B2

(12) United States Patent
Wolf et al.

(10) Patent No.: US 12,558,932 B2
(45) Date of Patent: Feb. 24, 2026

(54) VEHICLE ACCESSORY ATTACHMENT SYSTEM

(71) Applicant: Rivian IP Holdings, LLC, Plymouth, MI (US)

(72) Inventors: Philipp Josef Wolf, Dana Point, CA (US); Mark Lennard Taylor, Laguna Beach, CA (US); Benjamin James Richards, Irvine, CA (US); Raghav Jaswal, Coventry (GB); James John Alexander Dowle, Laguna Beach, CA (US)

(73) Assignee: RIVIAN IP HOLDINGS, LLC, Plymouth, MI (US)

( * ) Notice: Subject to any disclaimer, the term of this patent is extended or adjusted under 35 U.S.C. 154(b) by 552 days.

(21) Appl. No.: 18/091,311

(22) Filed: Dec. 29, 2022

(65) Prior Publication Data

US 2024/0217284 A1     Jul. 4, 2024

(51) Int. Cl.
*B60D 1/52*      (2006.01)
*B60D 1/36*      (2006.01)
*B60D 1/64*      (2006.01)

(52) U.S. Cl.
CPC ................. *B60D 1/52* (2013.01); *B60D 1/36* (2013.01); *B60D 1/64* (2013.01)

(58) Field of Classification Search
CPC ... B60D 1/52; B60D 1/36; B60D 1/64; B60D 1/485
See application file for complete search history.

(56) References Cited

U.S. PATENT DOCUMENTS

| | | | | |
|---|---|---|---|---|
| 4,033,601 | A | * 7/1977 | Lindahl .................... | B60D 1/46 |
| | | | | 280/490.1 |
| 7,889,062 | B1 | * 2/2011 | Albisa ...................... | B60D 1/62 |
| | | | | 340/687 |
| 8,979,112 | B2 | * 3/2015 | Weipert ................... | B60D 1/54 |
| | | | | 280/491.5 |
| 9,381,782 | B2 | * 7/2016 | Schwennsen .......... | B60D 1/247 |
| 9,434,225 | B1 | * 9/2016 | Corsaut .................... | B60D 1/64 |
| 10,704,972 | B2 | * 7/2020 | Lassche ................... | B60D 1/58 |

(Continued)

OTHER PUBLICATIONS

Brink. (Oct. 7, 2017). "Brink diagonal detachable towbar." Located at: brink diagonal detachable towbar 554570—Google Search , 17 pages.

*Primary Examiner* — Alentin Neacsu
*Assistant Examiner* — Marlon A Arce
(74) *Attorney, Agent, or Firm* — Patterson + Sheridan, LLP

(57) ABSTRACT

Some embodiments may provide an accessory attachment system for a vehicle. The system may include a retention bracket and a removable accessory bracket. The retention bracket may be configured to attach to the vehicle. The retention bracket may include a first retention connector and a second retention connector. The removable accessory bracket may include a first accessory connector and a second accessory connector. The first accessory connector may include a C-shape. The first accessory connector may be configured to couple to the first retention connector and may enable a rotation of the removable accessory bracket relative to the retention bracket. The second accessory connector may be configured to couple to the second retention connector and may limit the rotation of the removable accessory bracket relative to the retention bracket.

16 Claims, 12 Drawing Sheets

(56) References Cited

U.S. PATENT DOCUMENTS

| | | | |
|---|---|---|---|
| 10,857,846 B1 * | 12/2020 | Jacobs | B60D 1/06 |
| 11,602,931 B2 * | 3/2023 | Murayama | B41J 2/04581 |
| D1,015,958 S * | 2/2024 | Tang | D12/162 |
| 12,097,732 B2 * | 9/2024 | Borkholder | B60D 1/065 |
| 12,304,258 B1 * | 5/2025 | Yan | B60D 1/06 |
| 2010/0127479 A1 * | 5/2010 | Weipert | B60D 1/42 |
| | | | 280/491.1 |
| 2018/0215215 A1 * | 8/2018 | Faust | B60D 1/52 |
| 2020/0198423 A1 * | 6/2020 | Reed | G01L 5/0033 |
| 2022/0219500 A1 * | 7/2022 | Shaeff | B60D 1/246 |

* cited by examiner

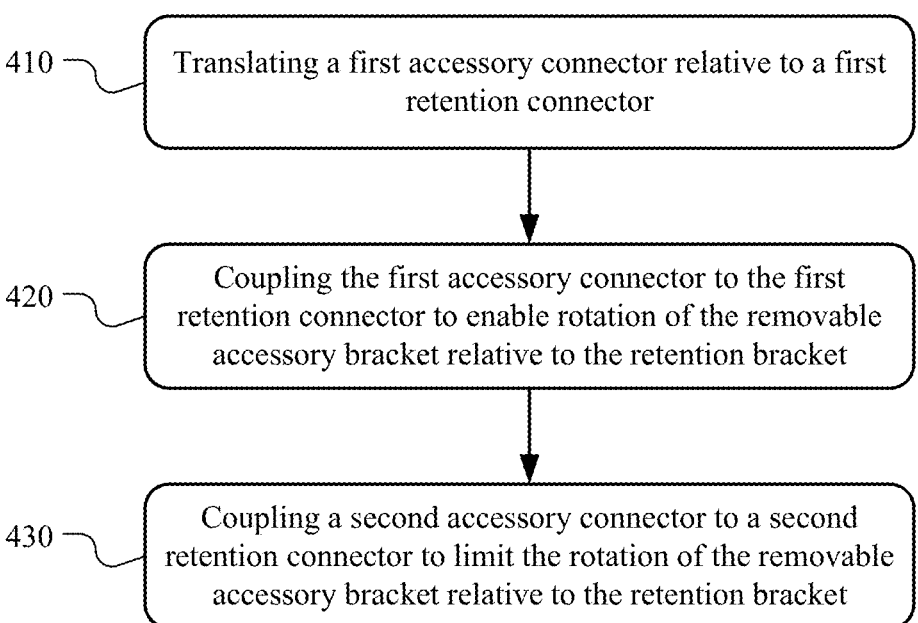

400

410 — Translating a first accessory connector relative to a first retention connector 420 — Coupling the first accessory connector to the first retention connector to enable rotation of the removable accessory bracket relative to the retention bracket 430 — Coupling a second accessory connector to a second retention connector to limit the rotation of the removable accessory bracket relative to the retention bracket

VEHICLE ACCESSORY ATTACHMENT SYSTEM

INTRODUCTION

Accessory attachment systems are used to couple a vehicle with vehicle accessories, such as equipment racks, cargo carriers, and trailers. Some accessory attachment systems may be removable, in whole or in part, from the vehicle so that they can be, for example, stored when the accessory is not being used.

BRIEF SUMMARY

Disclosed herein are accessory attachment systems for vehicles. An accessory attachment system may include a retention bracket attachable to a vehicle and a removable accessory bracket that may be coupled to the retention bracket. Embodiments of accessory attachment systems described herein may advantageously facilitate easier installation/removal of the removable accessory bracket to/from the retention bracket. The attachment systems can be configured to couple to, for example, equipment racks, cargo carriers, and trailers. When the accessory is a trailer (or other towed accessory), embodiments of the accessory attachment systems may provide increased vehicle departure angles compared to traditional accessory attachment systems. This may also be particularly advantageous in situations involving uneven or steep road conditions (e.g., off-roading).

The retention bracket and the removable accessory bracket may be coupled together by two sets of connectors. A first set of connectors may be configured to, when coupled, limit relative translation of the brackets but permit relative rotation of the brackets along an axis of the first set of connectors. A second set of connectors maybe configured to, when coupled, limit the relative rotation of the brackets about the axis.

The retention bracket may include a first retention connector and a second retention connector. The removable accessory bracket may include a first accessory connector and a second accessory connector. The first accessory connector may include a C-shape and the first retention connector may include a rod, where the C-shape connector and the rod may be configured to couple. To couple the first set of connectors, the first accessory connector may be translated relative to the first retention connector so that the open end of the C-shape passes over the rod. The C-shape may then allow for rotation of the removable accessory bracket relative to the retention bracket. Thereafter, coupling the second accessory connector and second retention connector may limit the rotation of the removable accessory bracket relative to the retention bracket.

In some embodiments, an accessory attachment system for a vehicle may include a retention bracket and a removable accessory bracket. The retention bracket may be configured to attach to the vehicle. The retention bracket may include a first retention connector and a second retention connector. The removable accessory bracket may include a first accessory connector and a second accessory connector. The first accessory connector may include a C-shape. The first accessory connector may be configured to couple to the first retention connector and may enable a rotation of the removable accessory bracket relative to the retention bracket. The second accessory connector may be configured to couple to the second retention connector and may limit the rotation of the removable accessory bracket relative to the retention bracket.

In some embodiments, the first accessory connector may be configured to couple to the first retention connector and may limit a translation of the removable accessory bracket relative to the retention bracket.

In some embodiments, the first retention connector may include a rod. The rod may be configured to couple to the C-shape of the first accessory connector.

In some embodiments, the system may include an access panel. The access panel may be configured to couple to the removable accessory bracket.

In some embodiments, at least one of the second retention connector or the second accessory connector may include a holding element, for example, a pin, a bolt, a spring-loaded mechanism, or a ratcheting mechanism. The pin, the bolt, the spring-loaded mechanism, or the ratcheting mechanism may limit the rotation of the removable accessory bracket relative to the retention bracket.

In some embodiments, the coupling of second retention connector and the second accessory connector may be actuated electronically or manually.

In some embodiments, the system may include an actuation interface. The actuation interface may be associated with the electronically actuated coupling.

In some embodiments, the second retention connector and the second accessory connector may be coupled when the retention bracket and the removable accessory bracket are determined to be in a lock position.

In some embodiments, the system may include a position or proximity sensor. The system may also include a processor. The processor may be configured to receive a signal from the sensor. The processor may also configured to, in response to receiving a signal indicating that the retention bracket and the removable accessory bracket are in a lock position, actuating the coupling of the second retention connector and the second accessory connector.

In some embodiments, the C-shape may be configured to allow the first accessory connector to couple to the first retention connector. The coupling may be at a first relative-rotation range between the removable accessory bracket and the retention bracket. The C-shape may also be configured to prevent the first accessory connector from decoupling from the first retention connector. The decoupling may be prevented at a second relative-rotation range between the removable accessory bracket and the retention bracket.

In some embodiments, the first accessory connector may be configured to enable a limited rotation of the removable accessory bracket relative to the retention bracket.

In some embodiments, the retention bracket may be configured to attached to a hitch beam of a vehicle.

In some embodiments, the retention bracket may include an electrical retention connector. The removable accessory connector may include an electrical accessory connector. The retention bracket and the removable accessory connector may be electrically coupled when the electrical retention connector and the electrical accessory connector are coupled.

In some embodiments, the electrically coupled electrical retention connector and electrical accessory connector may transfer power or data.

In some embodiments, a vehicle may include a retention bracket, a removable accessory bracket, and an actuation mechanism. The retention bracket may be attached to a hitch beam. The retention bracket may include a first retention connector and a second retention connector. The removable accessory bracket may include a first accessory connector and a second accessory connector. The first accessory connector and the first retention connector may include a C-shaped connector and a connector that may be configured to couple to the C-shaped connector. The first accessory connector and the first retention connector may be configured to couple to enable a rotation of the removable accessory bracket relative to the retention bracket. The second accessory connector may be configured to couple to the second retention connector to limit the rotation of the removable accessory bracket relative to the retention bracket. The actuation mechanism may be configured to decouple the second accessory connector and the second retention connector.

In some embodiments, the vehicle may include a hitch beam and a cladding. The cladding may be configured to be attachable to the vehicle. The retention bracket may be flush with, or may be recessed into, the cladding.

In some embodiments, the retention bracket may be recessed into the cladding such that the second retention connector may not be accessible from outside the cladding.

In some embodiments, the vehicle may include an access panel. The access panel may be configured to cover the retention bracket. The access panel may cover the retention bracket when the retention bracket and the removable accessory bracket are not coupled.

In some embodiments, a method may provide for attaching accessories to a vehicle. The method may include translating a first accessory connector of a removable accessory bracket relative to a first retention connector of a retention bracket. The method may also include coupling the first accessory connector to the second accessory connector. Coupling the first accessory connector to the second accessory connector may enable a rotation of the removable accessory bracket relative to the retention bracket. The method may also include coupling a second accessory connector of the removable accessory bracket to a second retention connector of the retention bracket. Coupling the second accessory connector to the second retention connector may limit the rotation of the removable accessory bracket relative to the retention bracket.

In some embodiments, the method may include actuating a mechanism to automatically decouple the second accessory connector and the second retention connector.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4 is a flowchart illustrating steps of a method for attaching accessories to a vehicle.

DETAILED DESCRIPTION

Disclosed herein are accessory attachment systems for vehicles. An accessory attachment system may include a retention bracket attachable to a vehicle and a removable accessory bracket that may be coupled to the retention bracket. Embodiments of accessory attachment systems described herein may advantageously facilitate easier installation/removal of the removable accessory bracket to/from the retention bracket. The attachment systems can be configured to couple to, for example, equipment racks, cargo carriers, and trailers. When the accessory is a trailer (or other towed accessory), embodiments of the accessory attachment systems may provide increased vehicle departure angles compared to traditional accessory attachment systems. This may also be particularly advantageous in situations involving uneven or steep road conditions (e.g., off-roading).

The retention bracket and the removable accessory bracket may be coupled together by two sets of connectors. A first set of connectors may be configured to, when coupled, limit relative translation of the brackets but permit relative rotation of the brackets along an axis of the first set of connectors. A second set of connectors maybe configured to, when coupled, limit the relative rotation of the brackets about the axis.

Figure 1A:
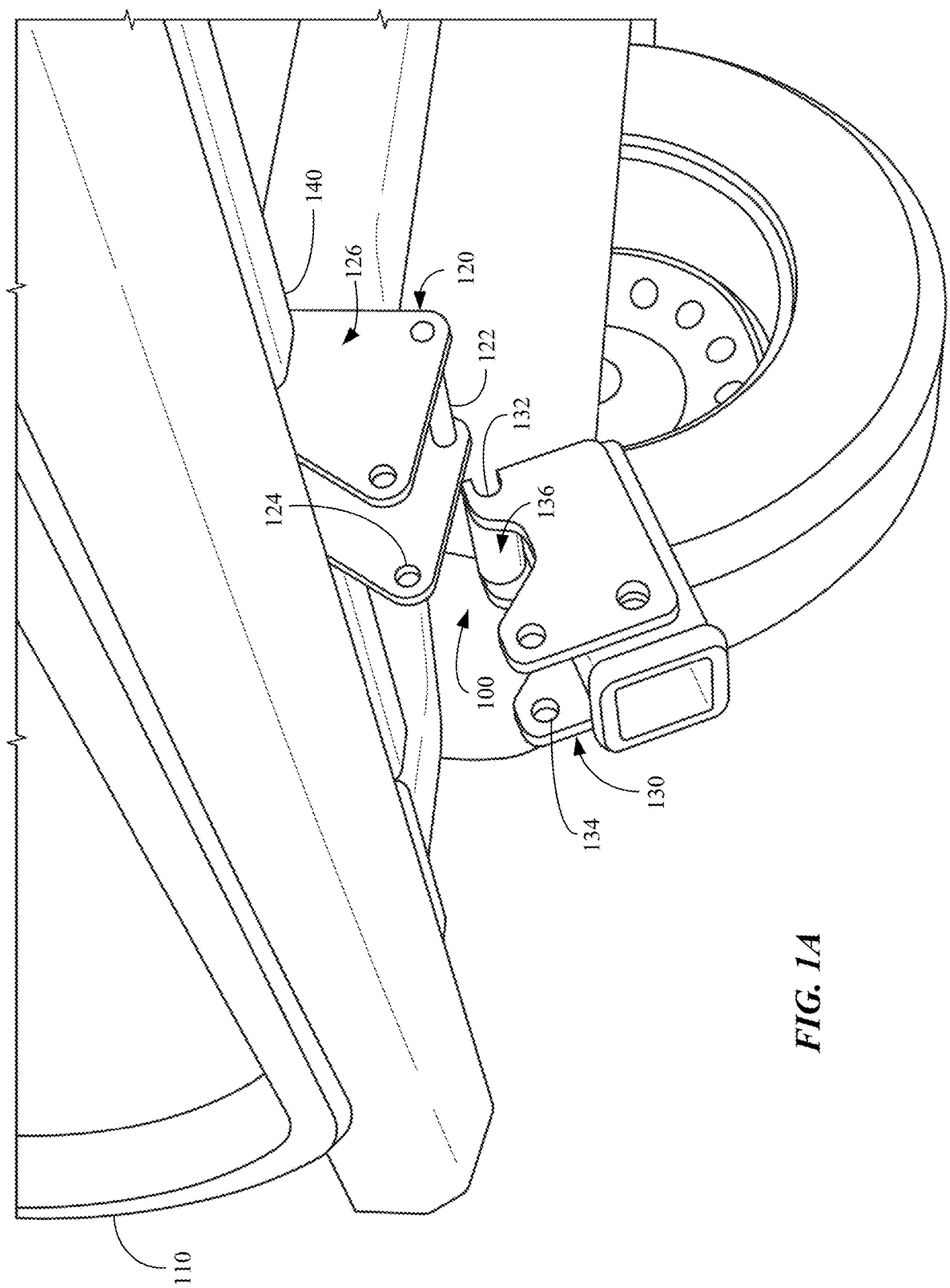
FIGS. 1A-1C illustrate an example accessory attachment system for a vehicle.
Figure 1B:
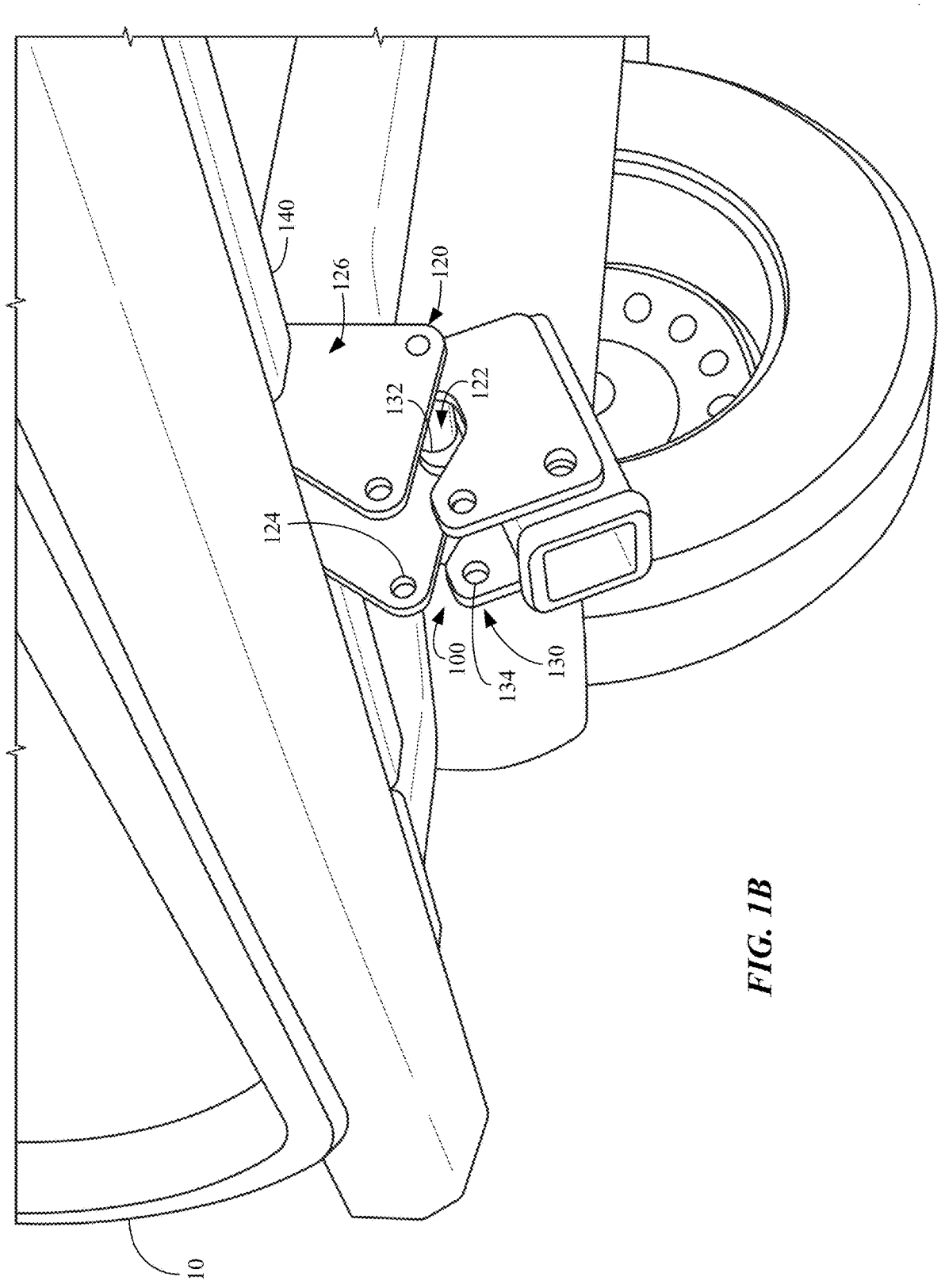
Figure 1C:
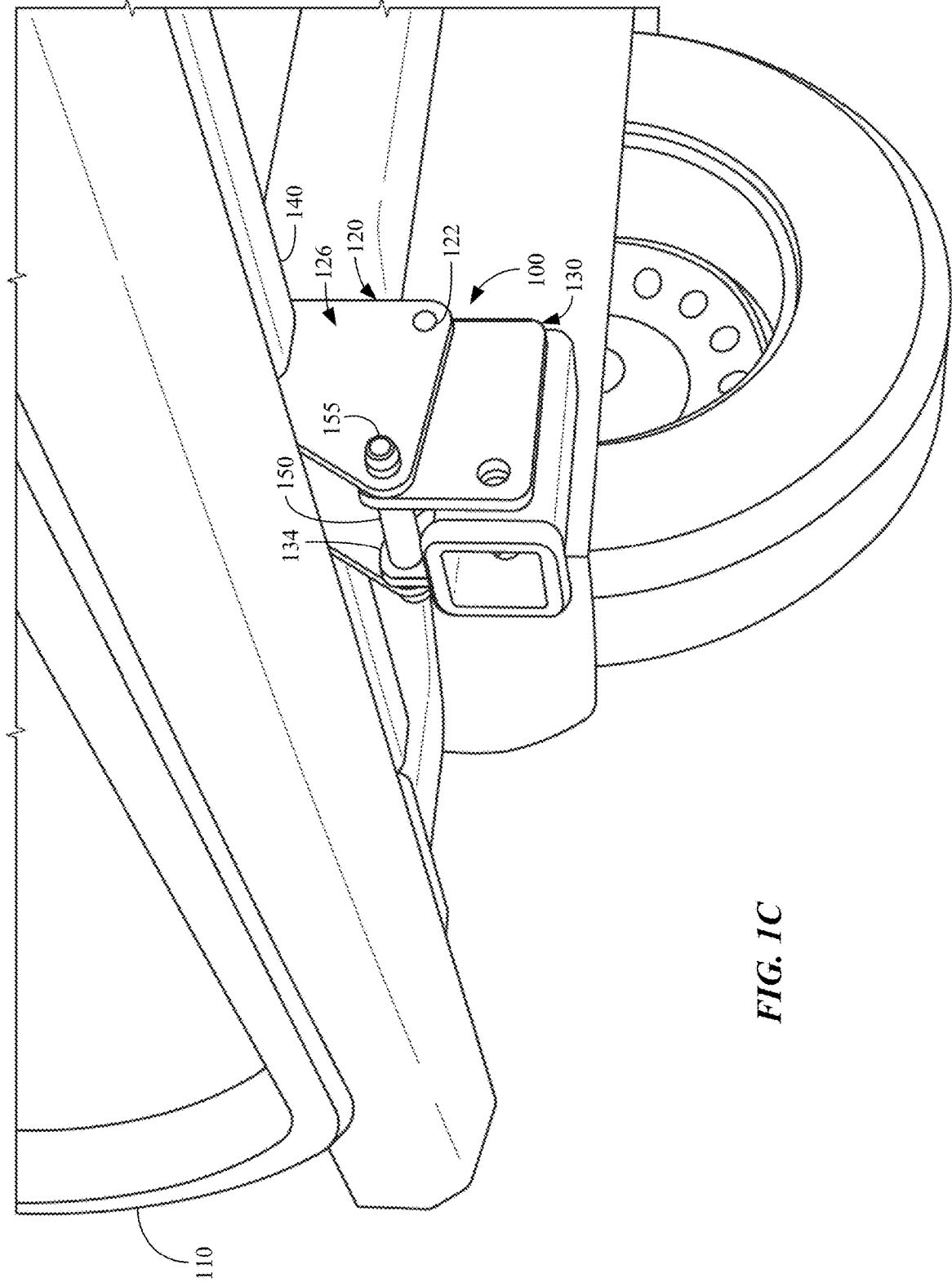

FIGS. 1A-1C illustrate an example accessory attachment system 100 coupling to vehicle 110. In the embodiment of FIGS. 1A-1C, accessory attachment system 100 is coupled to vehicle 110's hitch bar, but it will be appreciated that accessory attachment system 100 is not limited by the embodiment illustrated in FIGS. 1A-1C. In some embodiments, accessory attachment system 100 may include retention bracket 120 and removable accessory bracket 130. Retention bracket 120 and removable accessory bracket 130 may reduce the number of components to mount accessories to vehicle 110 and therefore may increase the usability of accessory attachment system 100 and may also reduce manufacturing costs. Further, retention bracket 120 and removable accessory bracket 130 may, in some embodiments, be configured for an easier coupling process, thereby reducing the burden imposed on a user.

As illustrated in FIGS. 1A-1C, retention bracket 120 may be configured to attach to vehicle 110. Retention bracket 120 may include first retention connector 122 and second retention connector 124. Removable accessory bracket 130 may include first accessory connector 132 and second accessory connector 134. Retention bracket 120 and removable accessory bracket 130 may, in some embodiments, be coupled by two connection points. For example, first accessory connector 132 may couple with first retention connector 122 and second accessory connector 134 may couple with second retention connector 124. A two-connection point system may increase the ease of installation or removal by the user. In comparison, traditional accessory attachment solutions require professional installation or assume infrequent removal to justify complicated coupling processes. Embodiments of accessory attachment systems herein greatly reduce user burden during the coupling process.

FIGS. 1A-1C illustrate a process of coupling components of attachment system 110. Between FIG. 1A and FIG. 1B, removable accessory bracket 130's first accessory connector 132 is coupled to first retention connector 122. Coupling first accessory connector 132 to first retention connector 122 may include translating first accessory connector 132 over first retention connector 122. The relative translation allows the open-end of first accessory connector 132's C-shape connector (described below) to pass over the rod of first retention connector 122. As shown in FIG. 1B, the coupling of first accessory connector 132 to first retention connector 122 allows for rotation of removable accessory bracket 130 relative to retention bracket 120.

To facilitate coupling, first accessory connector 132 may include a C-shape connector. The open end of the "C" allows first accessory connector 132 to pass over the rod and then allows for relative rotation of the brackets (about the axis defined by the rod) after coupling of the first accessory connector 132 and first retention connector 122. The C-shape of connector 132 is an example of an open-ended connector which couples the brackets by relative translation of the brackets and then allows for rotation of removable accessory bracket 130 relative to retention bracket 120 without decoupling of first retention connector 122 and first accessory connector 132. The open-end of the C-shape may simplify the insertion of first retention connector 122 into the C-shape. The C-shape, upon being positioned over first retention connector 122, may then be rotated such that first retention connector 122 and first accessory connector 132 do not decouple without external action. Examples of external action may be a user-rotating removable accessory bracket 130 such that first accessory connector 132 may be translated away from first retention connector 122. The closed-end of the C-shape may restrain the relative positions of retention bracket 120 and removable accessory bracket 130. As such, the C-shape may help single-user installation of removable accessory bracket 130; a user may even release the bracket, while the user gathers tools and/or repositions for example, and the removable accessory bracket may hang from the retention bracket. For example, the dimensions of the C-shape reduce the risk that removable accessory bracket 130 decouples, under its own weight, from retention bracket 120. In some embodiments of accessory attachment system 110, a user may decouple the brackets by translating accessory bracket 130 away from retention bracket 120 so that the open-end of the connector passes through rod 122.

As shown in the embodiment of FIG. 1A, the C-shape may be continuous from one end of removable accessory bracket 130 to the other end, so that the first accessory connector 132 includes a central section 136 (which is also C-shaped). In some embodiments, the central section 136 may be open so that only the C-shape connectors are at either end of the first accessory connector 132. Further, although the removable accessory bracket 130 in attachment system 100 includes a C-shape connector and retention bracket 120 includes a component (the rod) that receives the C-shape connector, it will be appreciated by those skilled in the art that the retention bracket 120 could include a C-shape connector and the removable accessory bracket 130 includes the component that is configured to connect to the C-shape connector.

Turning to FIG. 1C, second accessory connector 134 is coupled to second retention connector 124. In the embodiment of FIGS. 1A-1C, coupling of second accessory connector 134 to second retention connector 124 limits rotation of removable accessory bracket 130 relative to retention bracket 120. In the embodiment of FIG. 1C, the coupling includes holes (on the respective brackets), bolt 150, and nut 155, but other embodiments may utilize other connection mechanism to couple second accessory connector 134 and second retention connector 124, such as those described herein. In the embodiment of FIGS. 1A-1C, once first retention connector 122 and first accessory connector 132 are coupled, removable accessory bracket 130 is rotated until the holes are aligned. The user can then hold the removable accessory bracket 130 in position while inserting bolt 150 through the holes and then finish the coupling process by screwing nut 155 to bolt 150. In this configuration, the relative translation and the relative rotation of the brackets is limited; the attachment system is now ready for the accessory.

In some embodiments, at least one of second retention connector 124 and second accessory connector 134 includes a holding element, for example, a pin, a bolt, a spring-loaded mechanism, a cable mechanism, a lever mechanism, an electromagnetic mechanism, or a ratcheting mechanism to limit the translation and rotation of removable accessory bracket 130 relative to retention bracket 120. The coupling of second retention connector 124 and second accessory connector 134, in some embodiments, may be actuated electronically or manually. In some embodiments, the coupling may be actuated with an actuation interface (e.g., a lever, button, switch, or prompt on a user interface) associated with second retention connector 124 and second accessory connector 134. In some examples, the actuation interface is located within a closed-off space of the vehicle (e.g., a vehicle interior, vehicle trunk, covered truck bed or other cargo area) allowing, for example, the user to prevent operation of the actuation interface without access to the closed-off vehicle space. In another example, the actuation interface may include a mobile device which may be used when connected to the vehicle. In this example, the usage is not limited to inside the vehicle, and may be used anywhere the mobile device is connected to the vehicle. In another example, the actuation interface may also be located exterior to the vehicle but may only be used upon unlocking the interface or the vehicle. The actuation may couple or decouple second retention connector 124 and second accessory connector 134.

Electronic actuation of the coupling of second retention connector 124 and second accessory connector 134 may include activation of a solenoid. The solenoid may be actuated when a sensor detects retention bracket 120 and removable accessory bracket 130 are in a lock position. The lock position may be a pre-determined relative position of the connectors. Automatic actuation may advantageously ease a user's coupling retention bracket 120 and removable accessory bracket 130, especially when the user is coupling removable accessory bracket 130 without assistance. Alternatively, upon the sensor detecting the specified position, the actuation interface may prompt the user to actuate.

In some embodiments, retention bracket 120 may include one or more support plates 126. Support plates 126 may be removably or permanently attached to first retention connector 122. For example, a removable attachment of support plates 126 and first retention connector 122 may include holes in support plates 126 configured such that first retention connector 122 may be inserted into the holes. In another example, a permanent attachment of support plates 126 and first retention connector 122 may include an integral component including both support plates 126 and first retention connector 122. Support plates 126 may be attached to vehicle 110.

In some embodiments, retention bracket 120 may be configured to attach to hitch beam 140, which may be a component of, or attached to, vehicle 110. Additionally, support plates 126 may be configured to attach to hitch beam 140. Attachment to hitch beam 140 may increase the sustainable forces on accessory attachment system 100. Hitch beam 140 may be positioned about vehicle 110 to provide easier access to attaching retention bracket 120 to hitch beam 140, or to couple removable accessory bracket 130 to retention bracket 120.

As described above, first retention connector 122 may include a rod. The rod may include a round rod, or a polygonal rod (e.g., square, pentagonal, hexagonal, etc.). A round rod may reduce the user-effort required to rotate removable accessory bracket 130 relative to retention bracket 120. A polygonal rod may provide discrete steps for alignment of removable accessory bracket 130 and retention bracket 120. The rod may be a combination of a round rod and a polygonal rod. For example, a combination rod may include a cross section with a flat side and the remainder curved. The flat side may limit the rotation angle of the brackets when the first connectors are coupled. The rod may also be irregularly shaped. The irregularly shaped rod may aid the user in aligning of removable accessory bracket 130 and retention bracket 120. The irregularly shaped rod may also prevent the separation of removable accessory bracket 130 and retention bracket 120 when second accessory connector 134 and second retention connector 124 are not coupled.

In some embodiments, retention bracket 120 may include an electrical retention connector and removable accessory bracket may include an electrical accessory connector. Retention bracket 120 and removable accessory bracket 130 may be electrically coupled upon mechanical coupling. The electrically coupled electrical retention connector and electrical accessory connector may transmit power or data. The power and data transmission may be used to power or control the accessory. For example, the power and data transmission may be used to control trailer brake lights or trailer brakes, Although FIGS. 1A-1C primarily discusses attachment to a hitch beam, accessory attachment system 100 is not limited to attaching to any particular part of vehicle 110 and may be connected to any part of vehicle 110 or any part of a towed accessory (e.g., fifth-wheel, camp trailer, car trailer, or boat trailer) capable of supporting the static and dynamic forces associated with the accessory. Parts of the vehicle may include a front bumper of the vehicle, a front hitch beam, a roof of the vehicle, or a roof rack of the vehicle. The forces associated may vary depending on the intended use case of a particular accessory attachment system. For example, an accessory attachment system for carrying skis may have different magnitude and direction of forces as compared to one for towing a camper trailer. In some embodiments, accessory attachment system 100 may be attached to a body of vehicle 110, such as a chassis of the vehicle. The chassis of vehicle may include frame rails or a subframe. In some embodiments, accessory attachment system 100 may be attached to a wall or a stand. For example, accessory attachment system 100 may be attached to a garage wall for storage when not being used on vehicle 110. Using the same attachment system may reduce a footprint required to store the accessory, or may increase the stability and safety of the accessory when stored. This may be because the accessory may be stored vertically while secured to the wall. For example, a user may rest a traditional bike rack on the ground, increasing the footprint of the accessory, or may lean the traditional bike rack against the wall, increasing the risk that the traditional bike rack may be knocked over.

As noted, the removable accessory bracket may be configured to attach to one or more accessories. Such accessories may include, but are not limited to, a trailer, a swing-out table rack, a bike rack, a snowboard rack, a ski rack, or a cargo rack. Further, although the description of FIG. 1A-1C primarily discusses two connection points, it will be appreciated that some embodiments of the accessory attachment system herein are not limited to two connection points and additional points may be added.

Figure 2A:
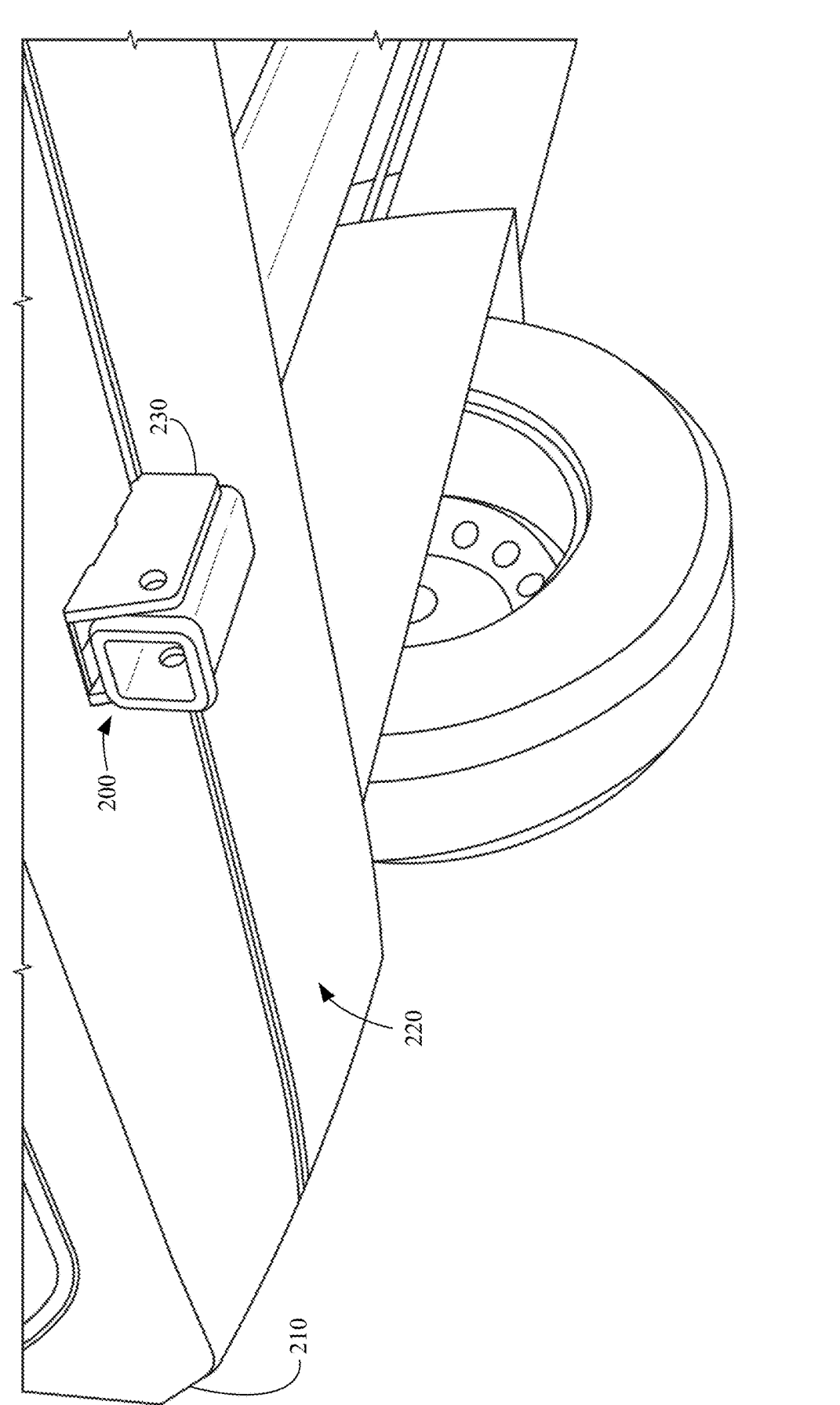
FIG. 2A illustrates an example accessory attachment system and a cladding for a vehicle

FIG. 2A illustrates an example accessory attachment system 200 for vehicle 210. In some embodiments, accessory attachment system 200 is accessory attachment system 100 described above with respect to FIGS. 1A-1C. Accessory attachment system 200 includes a retention bracket (not shown) and a removable accessory bracket 230 while vehicle 210 includes cladding 220 and a hitch beam (not shown) under cladding 220. In the embodiment of FIG. 2A, accessory attachment system 200 is attached to vehicle 210's hitch beam. Attaching the retention bracket to the hitch beam may include, but is not limited to, welding, fastening (e.g., with screws or rivets), or adhering (e.g., glue or epoxy). Alternatively, the retention bracket may be manufactured (e.g., cast) with the hitch beam.

In some embodiments, the retention bracket may be flush with, or recessed into, cladding 220. Cladding 220 may form a portion of vehicle 210's external body, which may protect various systems of vehicle 210, including accessory attachment system 200. Although cladding 220 is shown protecting the rear undercarriage of vehicle 210, it will be apparent to this skilled in the art that claddings can be used to protect other areas of vehicle 210. Protection of the systems may be accomplished by cladding 220 by reducing the amount of dirt, grime, and debris that reaches the systems. Cladding 220 may also improve the aesthetics and the aerodynamics of vehicle 210. Such improvements may be a result of a smoother surface on the underside of vehicle 210 from cladding 220 covering a portion of vehicle 210. The aerodynamics improvement may increase vehicle 210's range and fuel economy and reduce the volume or amount of wind noise. By attaching cladding 220, accessory attachment system 200 may provide a more aesthetic final product by reducing the protrusion of the retention bracket, with accessory attachment system 200 not visible when the retention bracket and removable accessory bracket are not coupled. Furthermore, the second retention connector may be inaccessible from outside cladding 220. In some embodiments, an access panel may be cut into cladding 220 to facilitate coupling of the removable accessory bracket 230 to the retention bracket of accessory attachment system 200. The access panel may also provide protection to systems and improve the aesthetics and aerodynamics of vehicle 210. The access panel may include a cover that covers the retention bracket of accessory attachment system 200 when not attached to removable accessory bracket 230. When the retention bracket is recessed into cladding 220, the second retention connector may be inaccessible while cladding 220 is attached to vehicle 210. This may deter accidental or intentional damage to the second retention connector or the second accessory connector. One additional advantage of reducing the retention bracket's protrusion includes reducing the impact on the departure angle of the vehicle. A departure angle of a vehicle describes the greatest angle that a vehicle can subtend with a surface when switching to or from that surface. The angle may be measured from the center of a section of a tire that is in contact with the ground (e.g., when the tire is loaded with the weight of the vehicle). The angle may be measured to a point where vehicle 210 may interfere with either surface. For example, when a vehicle travels down a hill and departs the hill to a flat surface, if the hill is too steep then the rear of the vehicle may hit the hill. The departure angle is that greatest angle that vehicle can tolerate without interfering or colliding with the hill. The departure angle also applies when the vehicle departs a flat surface to climb a hill. By positioning the retention bracket flush with, or recessed into, cladding 220, the departure angle of the vehicle is unchanged, or decreased by a specified amount, when removable accessory bracket 200 is not coupled. Even when removable accessory bracket 230 is coupled, embodiments here advantageously increase the departure angle available to the vehicle.

Figure 2B:
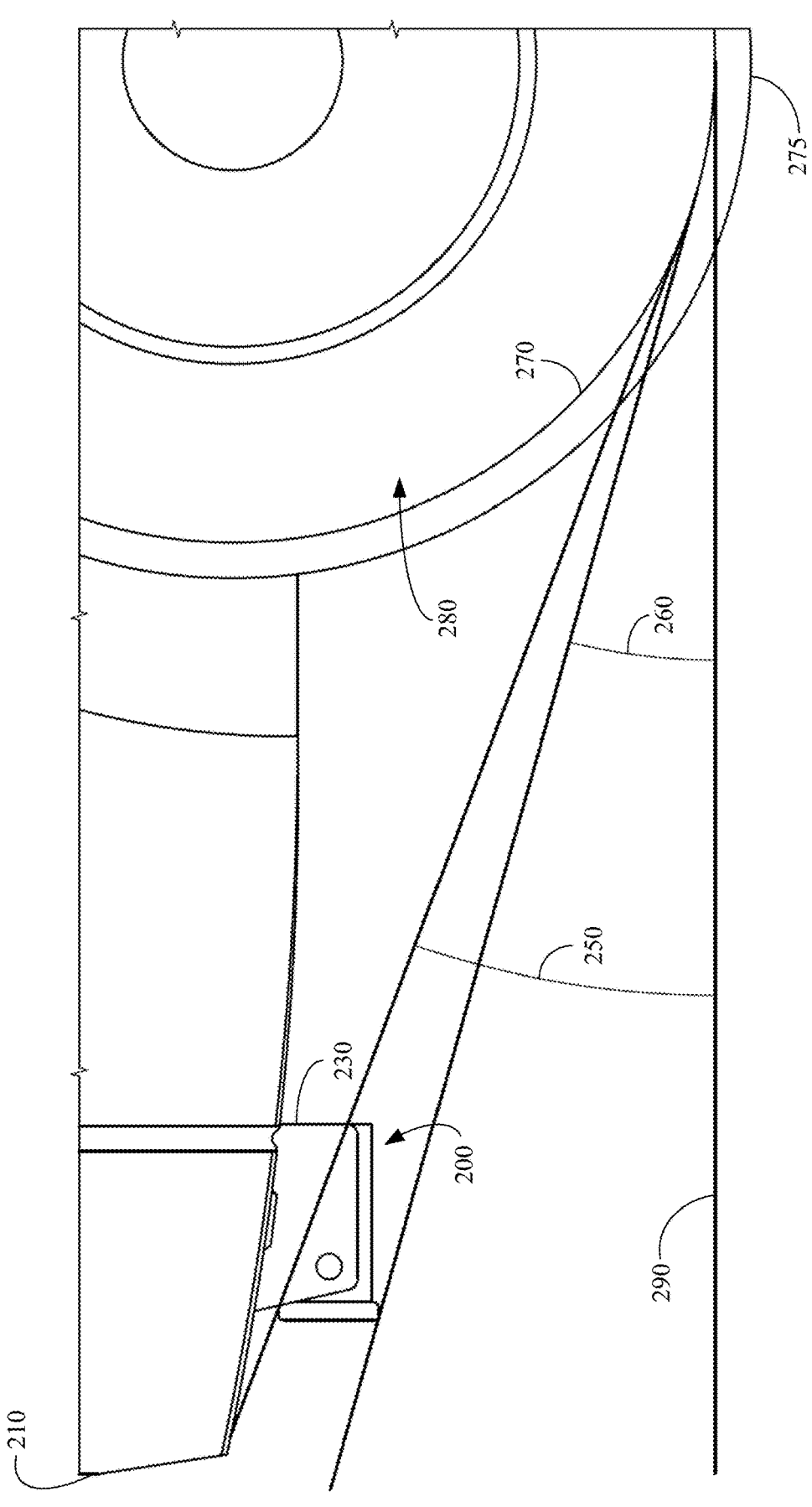
FIG. 2B illustrates example departure angles for the accessory attachment system.

FIG. 2B illustrates example departure angles for accessory attachment system 200. In some embodiments, base departure angle 250 of vehicle 210 may remain unchanged or may decrease by a specified amount when retention bracket (not shown) is attached to vehicle 210 but the removable accessory bracket is not, or when the retention bracket and the removable accessory bracket are attached to the vehicle. When the retention bracket and the removable accessory bracket are attached to the vehicle, the departure angle may be decreased to accessory departure angle 260. Base departure angle 250 or accessory departure angle 260 may be measured tangent from a static-load radius 270 of tire 280 that is in contact with ground 290 to an underside of vehicle 210. Ground 290, as illustrated in FIG. 2B, may be tangent with static-load radius 270 of tire 280 instead of unloaded radius 275 of tire 280 because the weight of vehicle 210 may deform tire 280 when in contact with ground 290 (e.g., deform tire 280 to static-load radius 270). Although addition of the removable accessory bracket decreases the departure angle, the decrease is less than the decrease required by known accessory attachment systems. The geometry of accessory attachment system 200 reduces the decrease in distance between the ground and the attachment point, and therefore reduces the decrease in departure angle. As illustrated in FIG. 2B, removable accessory bracket 230 increases the distance between bracket 230 and the ground when compared with known accessory attachment systems by reducing protrusions relative to the retention bracket. In some embodiments, removing removable accessory bracket 230 can increase the departure angle of vehicle 110. An increase in departure angle can reduce the likelihood of contact between the rear of the vehicle and an obstruction below the vehicle (e.g., rocks or uneven ground).

Figure 3A:
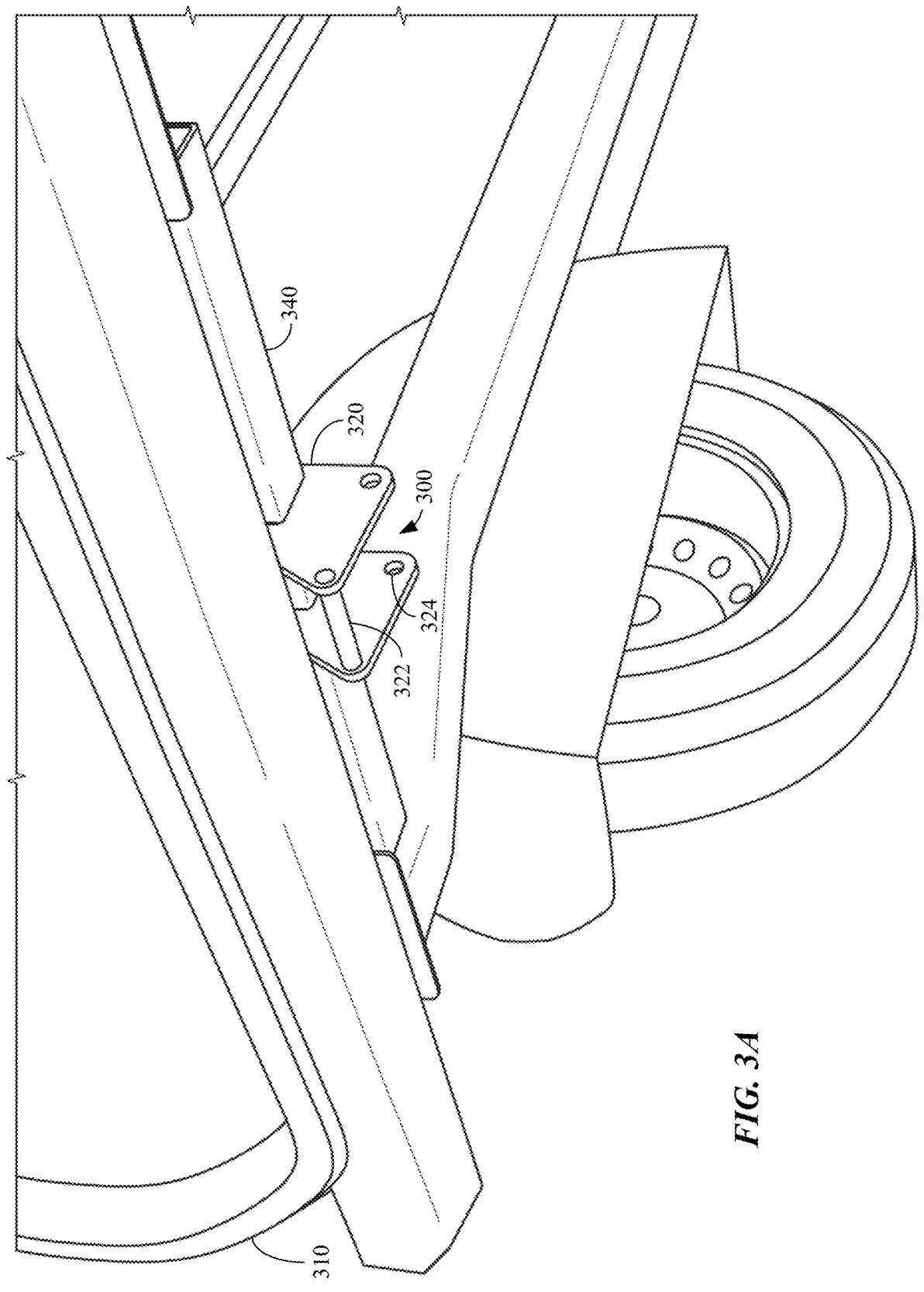
FIGS. 3A-3C illustrate another example accessory attachment system for a vehicle.
Figure 3B:
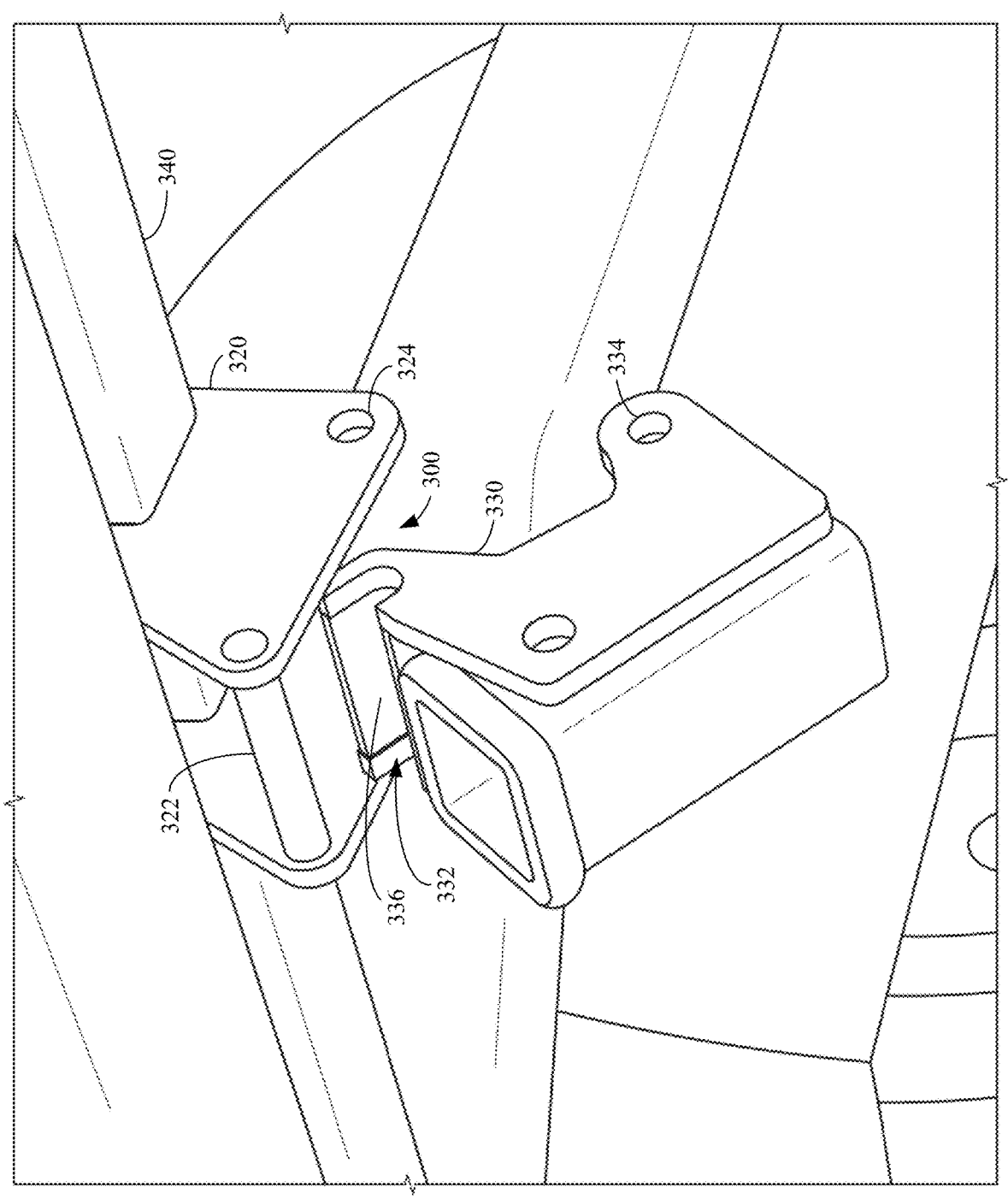
Figure 3C:
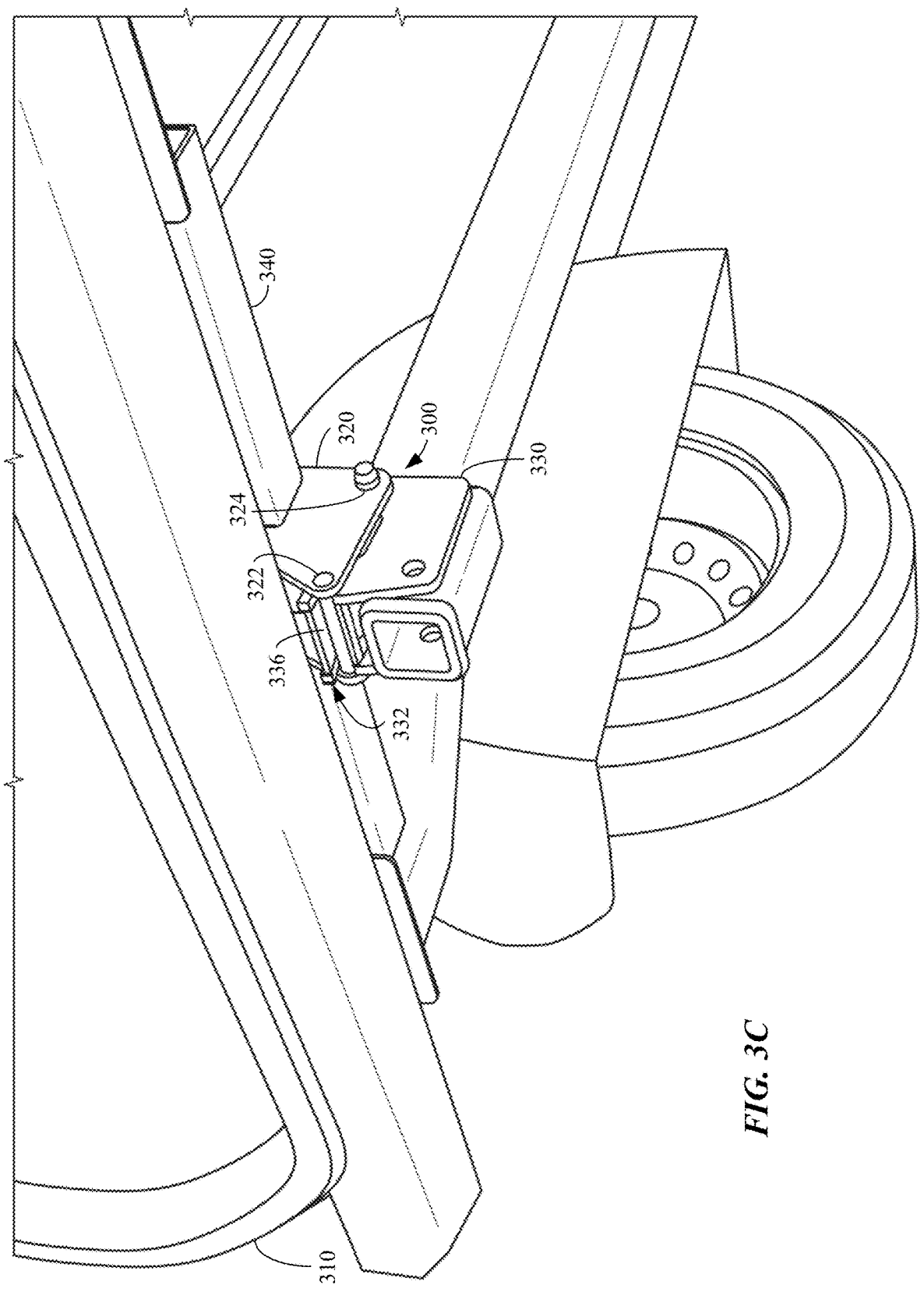

FIGS. 3A-3C illustrate another example accessory attachment system 300 coupling to vehicle 310. Illustrated in FIGS. 3A-3C are retention bracket 320 and removable accessory bracket 330. Like in FIGS. 1A-1C, retention bracket 320 may include first retention connector 322 and second retention connector 324, and removable accessory bracket may include first accessory connector 332 and second accessory connector 334. Accessory attachment system 300 may be coupled to vehicle 310's hitch bar 340, but it will be appreciated that accessory attachment system 300 is not limited by the embodiment illustrated by FIGS. 3A-3C. Removable accessory bracket may further include a central section 336, which may be C-shaped and be continuous from one end of removable accessory bracket 330 to the other end. The central section 336 may be open so that only the C-shape connectors are at either end of first accessory connector 332. In the embodiment of FIGS. 3A-3C, the positions of the first and second connectors are swapped from the embodiment of FIGS. 1A-1C. In accessory attachment system 300, the brackets are configured so that the rear (from the perspective of the vehicle) connectors are coupled first to permit rotation of the brackets, then the front connectors are coupled to limit rotation of the brackets. This configuration allows the user to first attach the connectors, first retention connector 322 and first accessory connector 332. Because these first connectors are located at the rear of vehicle 310, the user may be able to better see, and thus align, the first connectors.

As illustrated in FIGS. 3A-3C, retention bracket 320 may be configured to attach to vehicle 310. Similar to accessory attachment system 100 described above with respect to FIGS. 1A-1C, retention bracket 320 and removable accessory bracket 330 may, in some embodiments, be coupled by two connection points. For example, first accessory connector 332 may couple with first retention connector 322 and second accessory connector 334 may couple with second retention connector 324. Coupling first accessory connector 332 to first retention connector 322 may include translating first accessory connector 332 over first retention connector 322. The relative translation allows the open-end of first accessory connector 332's C-shape connector (see description of accessory system 100's C-shape connector above which is incorporated fully to the description of accessory system 300) to pass over the rod of first retention connector 322. The coupling of first accessory connector 332 to first retention connector 322 allows for rotation of removable accessory bracket 330 relative to retention bracket 320.

To facilitate coupling, first accessory connector 332 may include a C-shape connector. The open end of the "C" allows first accessory connector 332 to pass over the rod and then allows for relative rotation of the brackets (about the axis defined by the rod) after coupling of the first accessory connector 332 and first retention connector 322. The C-shape of connector 332 is an example of an open-ended connector which couples the brackets by relative translation of the brackets and then allows for rotation of removable accessory bracket 330 relative to retention bracket 320 without decoupling of first retention connector 322 and first accessory connector 332. The open-end of the C-shape may simplify the insertion of first retention connector 322 into the C-shape. The C-shape, upon being positioned over first retention connector 322, may then be rotated such that first retention connector 322 and first accessory connector 332 do not decouple without external action. Examples of external action may be a user-rotating removable accessory bracket 330 such that first accessory connector 332 may be translated away from first retention connector 322. The closed-end of the C-shape may restrain the relative positions of retention bracket 320 and removable accessory bracket 330. For example, the dimensions of the C-shape reduce the risk that removable accessory bracket 330 decouples, under its own weight, from retention bracket 320. In some embodiments of accessory attachment system 310, a user may decouple the brackets by translating accessory bracket 330 away from retention bracket 320 so that the open-end of the connector passes through rod 322.

Further, although the removable accessory bracket 330 in attachment system 300 includes a C-shape connector and retention bracket 320 includes a component (the rod) that receives the C-shape connector, it will be appreciated by those skilled in the art that the retention bracket 320 could include a C-shape connector and the removable accessory bracket 330 includes the component that is configured to connect to the C-shape connector.

In some embodiments, second accessory connector 334 is coupled to second retention connector 324. The coupling of second accessory connector 334 to second retention connector 324 may limit rotation of removable accessory bracket 330 relative to retention bracket 320.

The coupling of second retention connector 324 and second accessory connector 334, in some embodiments, may be actuated electronically or manually. In some embodiments, the coupling may be actuated with an actuation interface associated with second retention connector 324 and second accessory connector 334. The actuation may couple or decouple second retention connector 324 and second accessory connector 334. Electronic actuation (see description of accessory system 100's electronic actuation above which is incorporated fully to the description of accessory system 300) of the coupling of second retention connector 324 and second accessory connector 334 may include activation of a solenoid. The solenoid may be actuated when a sensor detects retention bracket 320 and removable accessory bracket 330 are in a lock position. The lock position may be a pre-determined relative position of the connectors. Alternatively, upon the sensor detecting the specified position, the actuation interface may prompt the user to actuate.

In some embodiments, retention bracket 320 may include one or more support plates. Support plates may be removably or permanently attached to first retention connector 322.

FIG. 4 is a flowchart illustrating steps of a method 400 for attaching accessories to a vehicle. Method 400 may begin at step 410 with translating a first accessory connector to a first retention connector. Method 400 may then continue at step 420 with coupling the first accessory connector to the first retention connector to enable rotation of the removable accessory bracket relative to the retention bracket. Method 400 may then continue at step 430 with coupling a second accessory connector to a second retention connector to limit the rotation of the removable accessory bracket relative the retention bracket.

Step 410 may include translating the first accessory connector past the first retention connector. For example, a C-shaped connector of the first accessory connector may be translated such that the first retention connector is positioned within the C-shaped connector. In another example, the first retention connector may include a C-shaped connector, and the first accessory connector may be translated such that the first accessory connector is positioned within the C-shaped connector.

Step 410 may include translating the removable accessory bracket in a specified orientation. The specified orientation may facilitate step 420 to be performed. An example of a specified orientation is orientating removable accessory bracket such that when first connectors, the first retention connector and the first accessory connector, are coupled, the second connectors, the second retention connector and the second accessory connector, may be positioned to be coupled without decoupling the first connectors.

The coupling of the first connectors in step 420 may include positioning one of the first connectors within the other first connector. For example, the first accessory connector may be positioned within the first retention connector, or the first retention connector may be positioned within the first accessory connector. When one of the first connectors is within the other first connector, step 420 may further include the removable accessory bracket being rotated. The rotation of the removable accessory bracket may couple the first connectors. Once the first connectors are coupled, the removable accessory bracket may be supported by the first connectors. For example, the removable accessory bracket may hang from the retention bracket.

The coupling of second connectors, the second retention connector and the second accessory connector, in step 430 may include the use of a holding element such as a pin, a bolt, a spring-loaded mechanism, or a ratcheting mechanism. Either of the second connectors may be one of the aforementioned mechanisms. The mechanisms may limit, or prevent, the rotation of the removable accessory bracket.

The coupling of the second connectors in step 430 may be performed manually or electronically. Manual coupling may include a user inserting the pin or the bolt, or a user actuating the spring-loaded or ratcheting mechanism. For example, the user may manually insert the pin or bolt through both the retention bracket and the removable accessory bracket. Electronic coupling may actuate the pin, bolt, spring-loaded, or ratcheting mechanism upon user input or sensor input. For example, the user may press a button on an actuation interface to couple the second connectors. In this example, when the button is pressed, the pin or bolt may be inserted through both the retention bracket and the removable accessory bracket by a motor, such as an electric or pneumatic motor. In another example, the coupling of the second connectors may be actuated when a sensor detects the removable accessory bracket relative to the retention bracket being in a specified position. The actuation may be performed automatically (e.g., without additional user input). The specified position may include both a relative position and a relative rotation of the removable accessory bracket and the retention bracket.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for attaching accessories to a vehicle including the particular steps of the method of FIG. 4, this disclosure contemplates any suitable method for attaching accessories to a vehicle including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
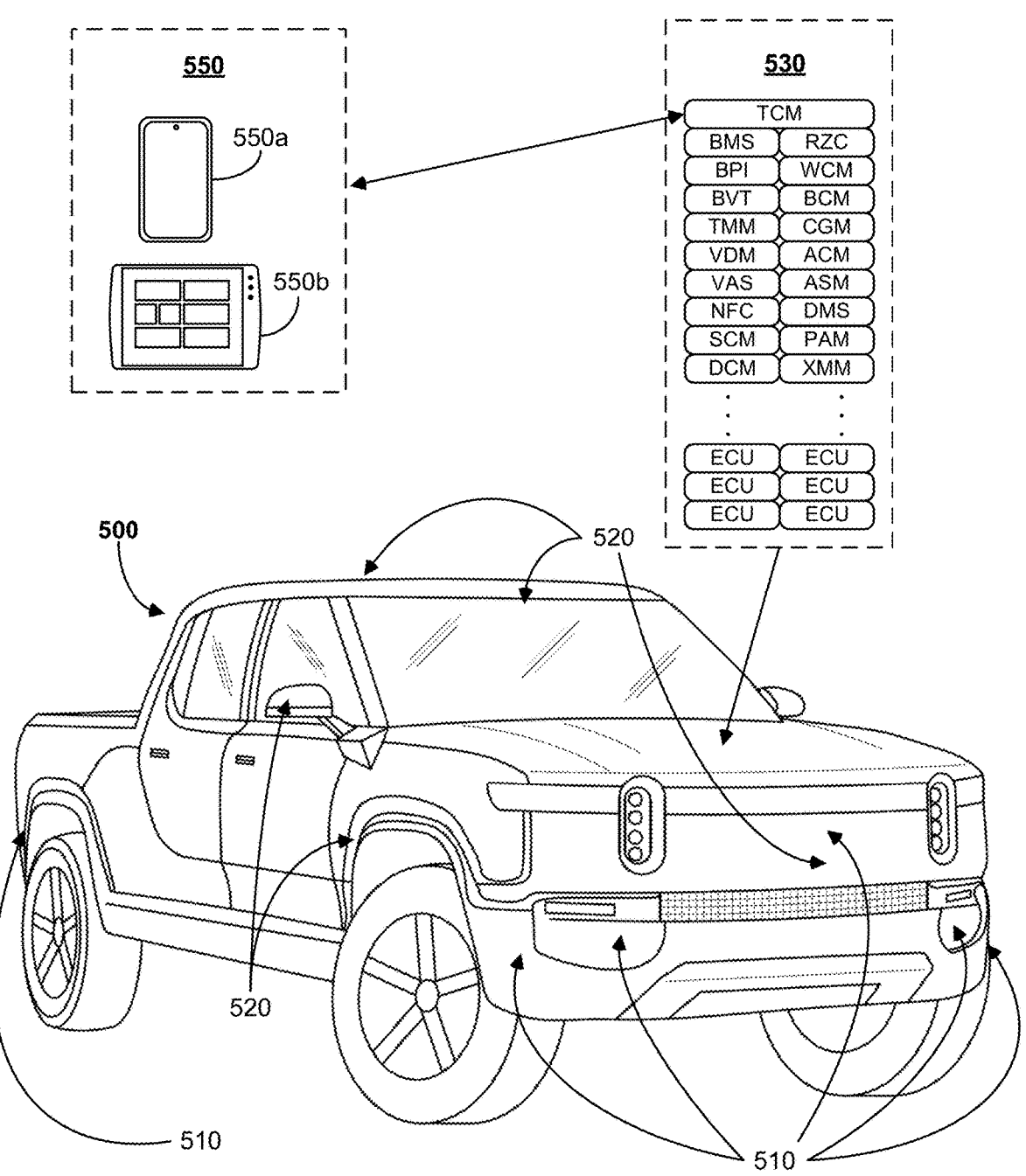
FIG. 5 illustrates an example vehicle.

FIG. 5 illustrates an example vehicle 500. Vehicle 500 may include multiple sensors 510, multiple cameras 520, and a control system 530. In some embodiments, vehicle 500 may be able to pair with a computing device 550 (e.g., smartphone 550a, tablet computing device 550b, or a smart vehicle accessory). As an example and not by way of limitation, a sensor 510 may be an accelerometer, a gyroscope, a magnometer, a global positioning satellite (GPS)

signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 520 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 500 may include various controllable components (e.g., doors, seats, windows, lights, HVAC, entertainment system, security system), instrument and information displays and/or interactive interfaces, functionality to pair a computing device 550 with the vehicle (which may enable control of certain vehicle functions using the computing device 550), and functionality to pair accessories with the vehicle, which may then be controllable through an interactive interface in the vehicle or through a paired computing device 550.

Control system 530 may enables control of various systems on-board the vehicle. As shown in FIG. 5, control system 530 may comprise one or more electronic control units (ECUs), each of which are dedicated to a specific set of functions. Each ECU may be a computer system (as described further in FIG. 7), and each ECU may include functionality provide by one or more of the example ECUs described below.

Features of embodiments as described herein may be controlled by one or more ECUs that provide functionality to control access to the vehicle. A Vehicle Access System (VAS) ECU may provide passive/active wireless sensors (e.g., Bluetooth) authorizing accessing (i.e., locking or unlocking) the vehicle. A Near-Field Communication (NFC) ECU may support an NFC reader embedded in the vehicle (e.g., in the driver-side exterior door handle or in the armrest of the interior, driver-side door panel) for user authentication.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 550, in-vehicle navigation, vehicle-to-vehicle communication, communication between the vehicle and landscape features (e.g., automated toll road sensors, automated toll gates, power dispensers at charging stations), or automated calling functionality.

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 530.

Vehicle 500 may include one or more additional ECUs, such as, by way of example and not limitation: a Central Gateway Module (CGM) ECU, a Vehicle Dynamics Module (VDM) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 500 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU.

Figure 6:
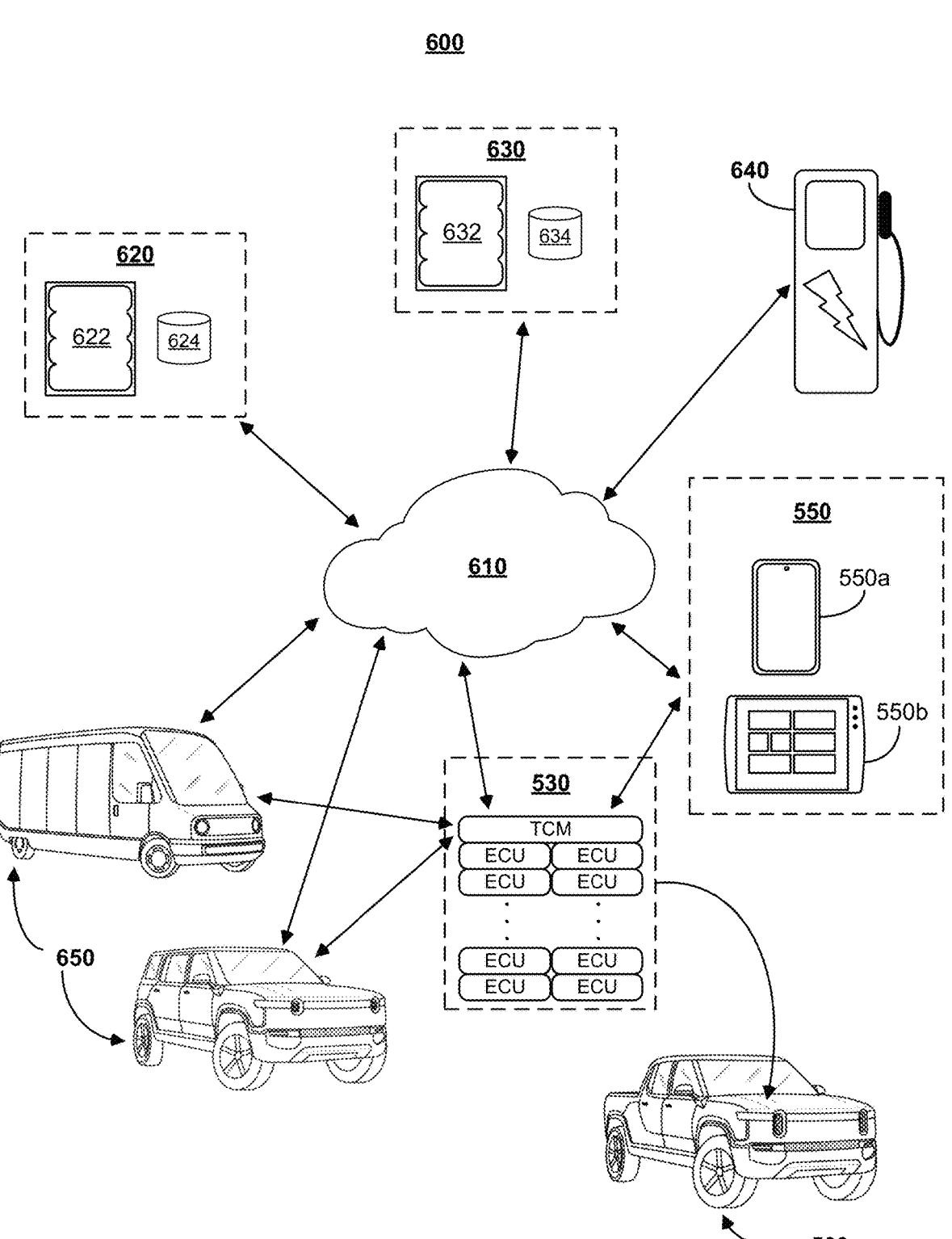
FIG. 6 illustrates an example network system including a connected vehicle.

FIG. 6 illustrates an example networked environment 600. Computer system 600 may include a connected vehicle 500 with a control system 530 that is capable of transmitting data to/from a network 610. Network 610 may also be connected to one or more computing servers 620 (e.g., including compute units 622 and storage units 624) associated with a vehicle manufacturer, a vehicle service provider, a vehicle fleet operator, or a vehicle-charging facility provider. Network 610 may also be connected to one or more third-party computing servers 630 (e.g., including compute units 632 and storage units 634) associated with, for example, a smart accessory manufacturer, a group event organizer, service provider, or a governmental organization. Networked environment 600 may include one or more landscape features 640 (e.g., automated toll road sensors, smart road signs or road markers, automated toll gates, power dispensers at charging stations). Networked environment 600 may also include other connected vehicles 650 that may be capable of communicating with vehicle 500 through network 610 and/or directly with vehicle 500 (e.g., by communicating with a TCM ECU of a control system 530 of vehicle 500 when connected vehicle 650 is within range of a short-range communications network, such as Bluetooth). Networked environment 600 may also include one or more computing devices 550 (e.g., smartphone 550a, a tablet computing device 550b, or a smart vehicle accessory) capable of communicating with network 610 and/or directly with vehicle 500.

Networked environment 600 may enable transmission of data and communications between any of the depicted elements. In some embodiments, such information may be communicated in only one direction (e.g., a smart road sign broadcasting information related to traffic control or delays due to construction); in other embodiments, information may include two-way communications (e.g., an automated toll gate that processes a request received from vehicle 500 to deduct a toll from a specified account and provides confirmation of the transaction). In particular embodiments, one or more elements of networked environment 600 may include one or more computer systems, as described in further detail with respect to FIG. 7A. In particular embodiments, one or more elements of networked environment 600 perform one or more steps of one or more methods described or illustrated herein. In particular embodiments, software running on one or more elements of networked environment 600 may be controlled by a single entity to perform one or more steps of one or more methods described or illustrated herein or provide functionality described or illustrated herein.

Figures 7A, 7B:
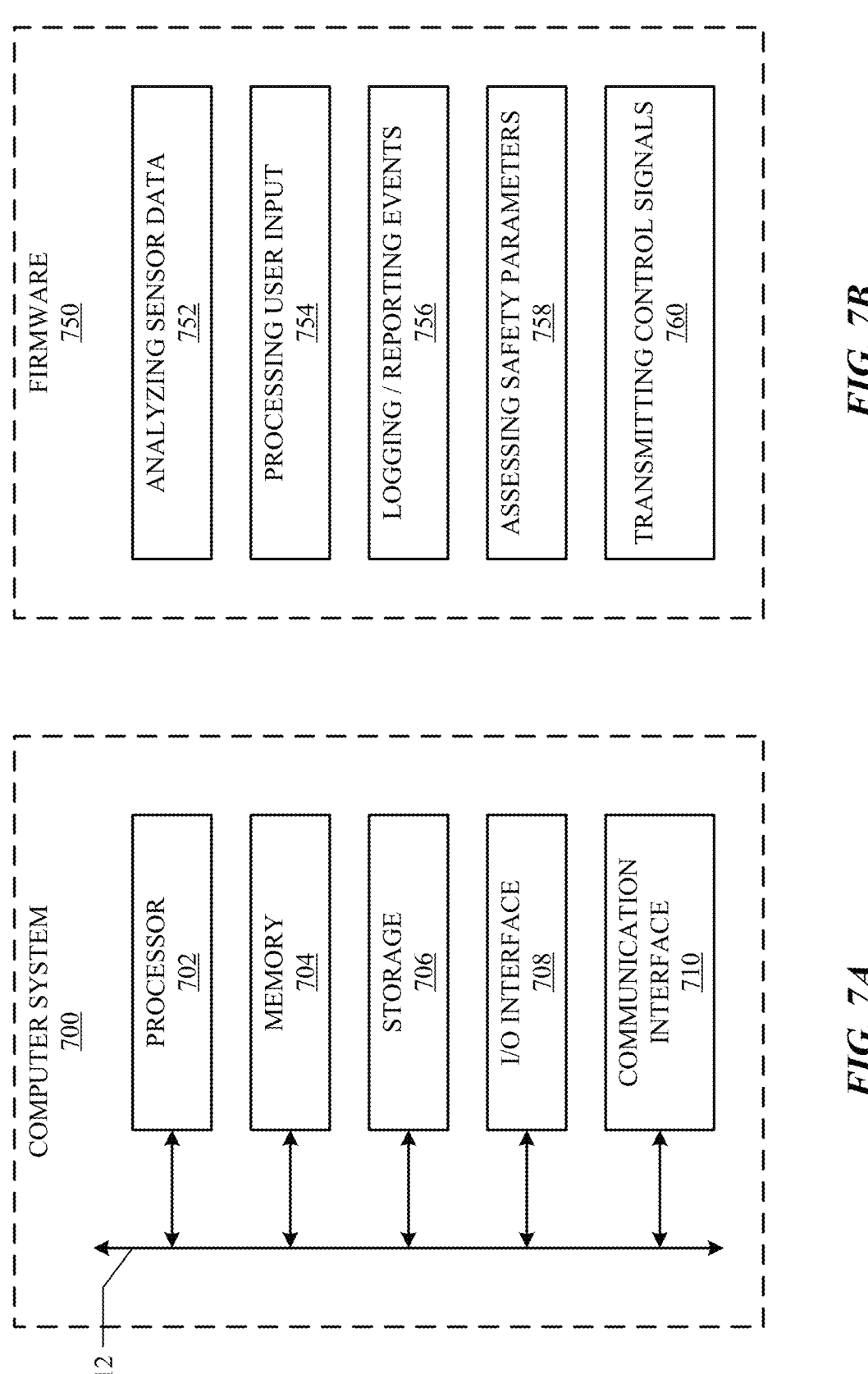
FIG. 7A is a schematic of an example computer system.
FIG. 7B illustrates example firmware for a vehicle ECU.

FIG. 7A illustrates an example computer system 700. Computer system 700 may include a processor 702, memory 704, storage 706, an input/output (I/O) interface 708, a communication interface 710, and a bus 712. Although this disclosure describes one example computer system including specified components in a particular arrangement, this disclosure contemplates any suitable computer system with any suitable number of any suitable components in any suitable arrangement. As an example and not by way of limitation, computer system 700 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 700 may include one or more computer systems 700; be unitary or distributed, span multiple locations, machines, or data centers; or reside in a cloud, which may include one or more cloud components in one or more networks. Where appropriate, computer system(s) 700 may perform, at different times or at different locations, in real time or in batch mode, one or more steps of one or more methods described or illustrated herein.

Processor 702 (e.g., compute units 622 and 632) may include hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706 (e.g., storage units 624 and 634). Processor 702 may include one or more internal caches for data, instructions, or addresses.

In particular embodiments, memory 704 includes main memory for storing instructions for processor 702 to execute or data for processor 702 to operate on. In particular embodiments, one or more memory management units (MMUs) reside between processor 702 and memory 704 and facilitate accesses to memory 704 requested by processor 702. In particular embodiments, memory 704 includes random access memory (RAM). This disclosure contemplates any suitable RAM.

In particular embodiments, storage 706 includes mass storage for data or instructions. As an example and not by way of limitation, storage 706 may include a removable disk drive, flash memory, an optical disc, a magneto-optical disc, magnetic tape, or a Universal Serial Bus (USB) drive or two or more of these. Storage 706 may include removable or fixed media and may be internal or external to computer system 700. Storage 706 may include any suitable form of non-volatile, solid-state memory or read-only memory (ROM).

In particular embodiments, I/O interface 708 includes hardware, software, or both, providing one or more interfaces for communication between computer system 700 and one or more input and/or output (I/O) devices. Computer system 700 may be communicably connected to one or more of these I/O devices, which may be incorporated into, plugged into, paired with, or otherwise communicably connected to vehicle 500 (e.g., through the TCM ECU). An input device may include any suitable device for converting volitional user input into digital signals that can be processed by computer system 700, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 510 described above. An output device may include devices designed to receive digital signals from computer system 700 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 708 for them. I/O interface 708 may include one or more I/O interfaces 708, where appropriate.

In particular embodiments, communication interface 710 includes hardware, software, or both providing one or more interfaces for data communication between computer system 700 and one or more other computer systems 700 or one or more networks. Communication interface 710 may include one or more interfaces to a controller area network (CAN) or to a local interconnect network (LIN). Communication interface 710 may include one or more of a serial peripheral interface (SPI) or an isolated serial peripheral interface (isoSPI). In some embodiments, communication interface 710 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 712 includes hardware, software, or both coupling components of computer system 700 to each other. Bus 712 may include any suitable bus, as well as one or more buses 712, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 7B illustrates example firmware 750 for a vehicle ECU 700 as described with respect to control system 530. Firmware 750 may include functions 752 for analyzing sensor data based on signals received from sensors 510 or cameras 520 received through communication interface 710. Firmware 750 may include functions 754 for processing user input (e.g., directly provided by a driver of or passenger in vehicle 500, or provided through a computing device 550) received through I/O interface 708. Firmware 750 may include functions 756 for logging detected events (which may be stored in storage 706 or uploaded to the cloud), as well as functions for reporting detected events (e.g., to a driver or passenger of the vehicle through an instrument display or interactive interface of the vehicle, or to a vehicle manufacturer, service provider, or third party through communication interface 710). Firmware 750 may include functions 758 for assessing safety parameters (e.g., monitoring the temperature of a vehicle battery or the distance between vehicle 500 and nearby vehicles). Firmware 750 may include functions 760 for transmitting control signals to components of vehicle 500, including other vehicle ECUs 700.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An accessory attachment system for a vehicle, comprising:
  a retention bracket configured to attach to the vehicle comprising:
    a first retention connector;
    a second retention connector; and
  a removable accessory bracket comprising:
    a first accessory connector comprising a C-shape; and
    a second accessory connector, wherein
      the first accessory connector is configured to couple to the first retention connector to enable a rotation of the removable accessory bracket relative to the retention bracket, and wherein
      the second accessory connector is configured to couple to the second retention connector to limit the rotation of the removable accessory bracket relative to the retention bracket,
    wherein at least one of the second retention connector or the second accessory connector comprises a holding element to limit the rotation of the removable accessory bracket relative to the retention bracket, and
    wherein the holding element comprises one of a pin, a bolt, a spring loaded mechanism or a ratcheting mechanism, and the coupling of second retention connector and the second accessory connector is actuated electronically.

2. The system of claim 1, wherein the first accessory connector is configured to couple to the first retention connector to limit a translation of the removable accessory bracket relative to the retention bracket.

3. The system of claim 1, wherein the first retention connector comprises a rod configured to couple to the C-shape of the first accessory connector.

4. The system of claim 1, further comprising an access panel configured to couple to the removable accessory bracket.

5. The system of claim 1, further comprising an actuation interface associated with the electronically actuated coupling, wherein the actuation interface is located within an interior of the vehicle.

6. The system of claim 1, wherein the second retention connector and the second accessory connector are coupled when the retention bracket and the removable accessory bracket are determined to be in a lock position.

7. The system of claim 6, further comprising
  a position or proximity sensor; and
  a processor configured to receive a signal from the sensor and is further configured to, in response to receiving a signal indicating that the retention bracket and the removable accessory bracket are in a lock position, actuating the coupling of the second retention connector and the second accessory connector.

8. The system of claim 1, wherein the C-shape is configured to:
  allow the first accessory connector to couple to the first retention connector at a first relative-rotation range between the removable accessory bracket and the retention bracket; and
  prevent the first accessory connector from decoupling from the first retention connector at a second relative-rotation range between the removable accessory bracket and the retention bracket.

9. The system of claim 1, wherein the first accessory connector is further configured to enable a limited rotation of the removable accessory bracket relative to the retention bracket.

10. The system of claim 1, wherein the retention bracket is further configured to attach to a hitch beam of a vehicle.

11. The system of claim 1, wherein the retention bracket further comprises an electrical retention connector; and
  the removable accessory bracket further comprises an electrical accessory connector, wherein the retention bracket and the removable accessory bracket are electrically coupled when the electrical retention connector and the electrical accessory connector are coupled.

12. The system of claim 11, wherein the electrically coupled electrical retention connector and electrical accessory connector can transfer power or data.

13. A vehicle comprising:
  a retention bracket attached to a hitch beam, the retention bracket comprising: a first retention connector;
  the hitch beam;
  a cladding, configured to be attachable to the vehicle, wherein the retention bracket is recessed into the cladding such that a second retention connector is not accessible from outside the cladding;
  the second retention connector; and
  a removable accessory bracket comprising: a first accessory connector, wherein
    the first accessory connector and first retention connector comprise a C-shaped connector and a connector configured to couple to the C-shaped connector, and wherein the first accessory connector and first retention connector are configured to couple to enable a rotation of the removable accessory bracket relative to the retention bracket;

and a second accessory connector, wherein the second accessory connector is configured to couple to the second retention connector to limit the rotation of the removable accessory bracket relative to the retention bracket; and an actuation mechanism configured to decouple the second accessory connector and the second retention connector.

14. The vehicle of claim 13, further comprising an access panel configured to cover the retention bracket when the retention bracket and removable accessory bracket are not coupled.

15. A method for attaching accessories to a vehicle, comprising:

translating a first accessory connector of a removable accessory bracket relative to a first retention connector of a retention bracket;

coupling the first accessory connector to the first retention connector to enable a rotation of the removable accessory bracket relative to the retention bracket; and coupling a second accessory connector of the removable accessory bracket to a second retention connector of the retention bracket to limit the rotation of the removable accessory bracket relative to the retention bracket, wherein at least one of the second retention connector or the second accessory connector comprises a holding element to limit the rotation of the removable accessory bracket relative to the retention bracket, and wherein the holding element comprises one of a pin, a bolt, a spring loaded mechanism or a ratcheting mechanism, and the coupling of second retention connector and the second accessory connector is actuated electronically.

16. The method of claim 15, further comprising actuating a mechanism to automatically decouple the second accessory connector and the second retention connector.

* * * * *